(12) United States Patent
Gutierrez et al.

(10) Patent No.: US 8,930,682 B2
(45) Date of Patent: Jan. 6, 2015

(54) HANDLING MEDIA STREAMS IN A PROGRAMMABLE BIT PROCESSOR

(75) Inventors: Raul Gutierrez, Folsom, CA (US); Suryaprasad Kareenahalli, Folsom, CA (US); Daniel Nemiroff, Folsom, CA (US); Balaji Vembu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 515 days.

(21) Appl. No.: 12/969,812

(22) Filed: Dec. 16, 2010

(65) Prior Publication Data

US 2012/0159128 A1 Jun. 21, 2012

(51) Int. Cl.
| G06F 9/30 | (2006.01) |
| G06F 9/345 | (2006.01) |
| G06F 9/38 | (2006.01) |
| H04L 12/861 | (2013.01) |

(52) U.S. Cl.
CPC ............ *G06F 9/345* (2013.01); *G06F 9/30018* (2013.01); *G06F 9/3009* (2013.01); *G06F 9/3851* (2013.01); *H04L 49/90* (2013.01)

USPC .......................................... 712/225; 712/244

(58) Field of Classification Search
USPC ......................................... 712/225; 386/330
See application file for complete search history.

(56) References Cited

U.S. PATENT DOCUMENTS

| 5,828,416 A | * | 10/1998 | Ryan .............................. 348/512 |
| 6,272,153 B1 | * | 8/2001 | Huang et al. ................... 370/503 |
| 6,577,640 B2 | * | 6/2003 | Mansouri et al. .............. 370/429 |
| 2008/0168468 A1 | * | 7/2008 | Mele et al. ...................... 719/313 |
| 2008/0253405 A1 | * | 10/2008 | Ng et al. ......................... 370/506 |
| 2011/0274414 A1 | * | 11/2011 | Nemiroff et al. .............. 386/331 |
| 2011/0280314 A1 | * | 11/2011 | Sankaran et al. ........ 375/240.25 |

* cited by examiner

*Primary Examiner* — Andrew Caldwell
*Assistant Examiner* — Yuqing Xiao
(74) *Attorney, Agent, or Firm* — Trop, Pruner & Hu, P.C.

(57) ABSTRACT

In one embodiment, the present invention is directed to a bit processor that includes an execution unit to, responsive to an instruction for access of data of a first bit width, access data of a second bit width, the second bit width having a different number of bits than the first bit width when some of the data accessed includes non-stream data. Other embodiments are described and claimed.

10 Claims, 7 Drawing Sheets

HANDLING MEDIA STREAMS IN A PROGRAMMABLE BIT PROCESSOR

BACKGROUND

Common tasks for modern computer systems include audio and video processing. In such systems, the audio and/or video data may be received from a storage of a system or a medium such as a DVD. In other examples, the incoming media stream can be received from the Internet. The received media stream from any of these sources typically is in a compressed form to minimize bandwidth/storage required for distribution/processing.

Common media compression algorithms use a combination of variable size symbols to quantize symbol values to achieve a targeted compression. Hence, media stream processing typically performs bit parsing to extract the variable size symbols as the first step in processing. Such bit level symbol identification and extraction is generally performed on traditional general purpose processors and microcontrollers. However, the lack of specific bit level processing infrastructure on these engines leads to comparatively complex code and flow control. Traditional processors and microcontrollers operate on a byte, word, or double word data paths. As such, media processing code typically uses an accumulator which is loaded from the bitstream and then consumed in a specific direction (e.g., most significant bit (MSB) to least significant bit (LSB)). As symbols are found, the accumulator bits are shifted out and the next set of bits from the bitstream is loaded into the accumulator with splicing (so that the accumulator appears like a moving window superimposed on the bitstream).

In most cases, audio/video data is also packaged in transport stream packets, which complicates parsing by breaking up the audio/video data into chunks that are then prefixed with arbitrary size headers. This packaging can lead to symbols spanning multiple packets with packet header bits interspersed between valid symbol bits. Accordingly, the parsing operations are computationally very expensive and require significant code in order to account for the interleaving of data among packet headers and other undesired information.

DETAILED DESCRIPTION

In various embodiments, a programmable general-purpose bit level parser may provide a hardware infrastructure that can enable more efficient bitstream processing. In some embodiments, such processor may provide for various features. First, the processor may provide an infrastructure targeted for efficient bit stream processing, rather than overloading a conventional load/store interface, which can eliminate the need for accumulation of bits, shifting, splicing, and so forth. Second, the processor may provide the ability to consume symbols straddling packetization structures (such as a transport layer or other header). In this way, a programmer can write simpler symbol parsing code that is agnostic of packet headers and handling of the same. Third, the processor may provide a simple instruction set that is tailored for variable length bit symbol parsing identification and loading into registers.

Still further a processor in accordance with an embodiment of the present invention may provide an infrastructure to write out characteristics of a consumed stream that can be used for next stage processing. While the scope of the present invention is not limited in this regard, in one embodiment, these characteristics may include identification information to identify which sections of the bitstream contain particular types of information. For example, information can be provided to indicate whether a first portion of a bitstream includes video data, such as a primary video content, e.g., highly sensitive video data such as high definition content, or secondary video content, such as alternate camera angles, supplemental information or low definition content. Still further, the characteristics provided may also indicate more generally, less sensitive video/audio/navigation data.

Figure 1:
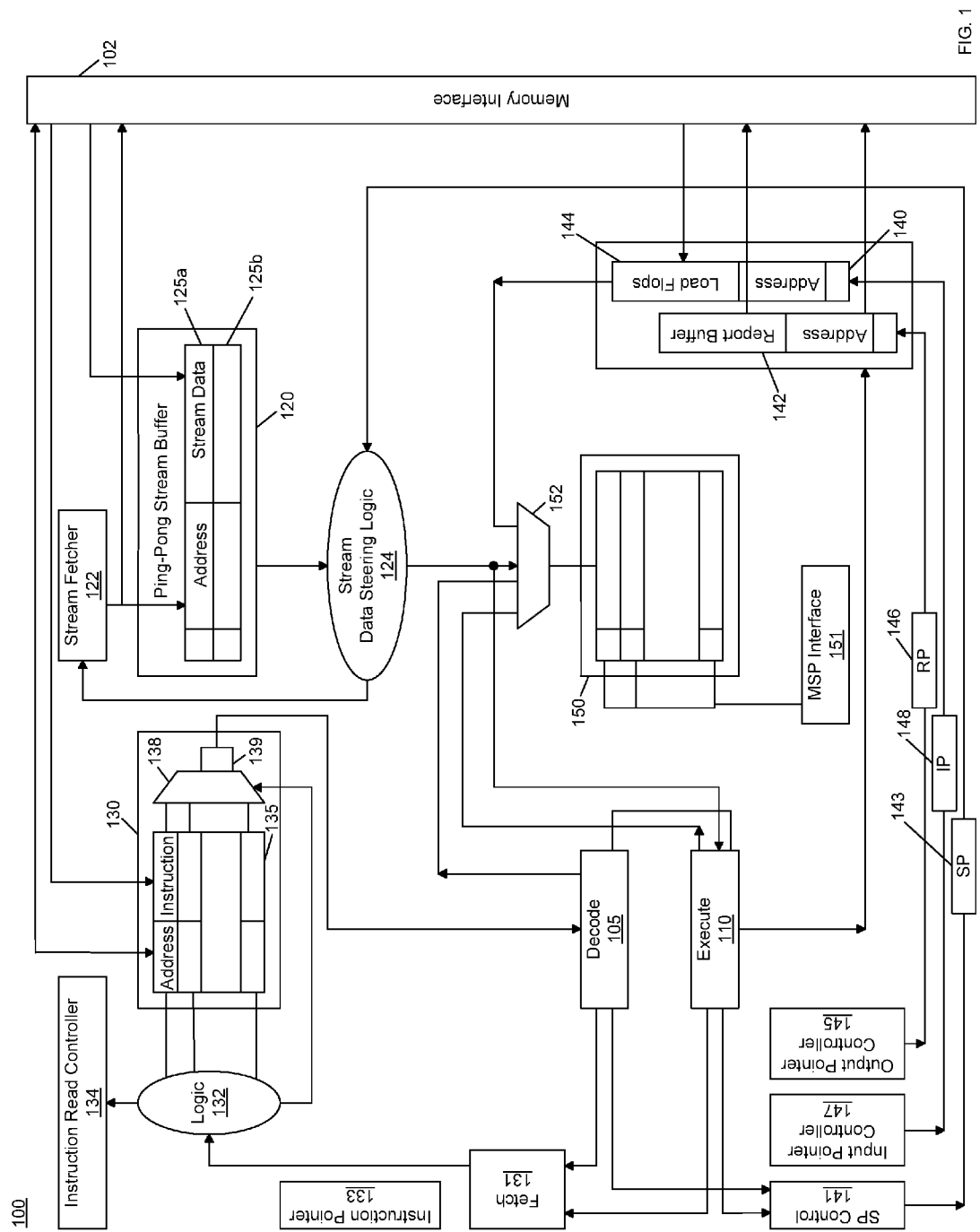
FIG. 1 is a block diagram of a programmable bit processor (PbP) in accordance with one embodiment of the present invention.

To better understand the capabilities of a media processor in accordance with an embodiment of the present invention, it is instructive to review an exemplary bit processor capable of handling incoming media streams with simplified bit parsing capabilities. Referring now to FIG. 1, shown is a block diagram of a programmable bit processor (PbP) 100. As seen in FIG. 1, processor 100 may be a relatively simple two-stage processor, including a decode unit 105 and an execute unit 110, in which the two stages operate in order such that decode unit 105 feeds instructions to be executed to execution unit 110. While the scope of the present invention is not limited in this regard, in one embodiment execution logic 110 may be a microcontroller, digital signal processor (DSP), a field programmable gate array (FPGA) or other programmable processor. In one embodiment, execution logic 110 may be a 16 bit (b) microcontroller tuned for media stream application usages like bit parsing. In one embodiment, the two stage operation may be formed of: (1) instruction fetch; and (2) decode and execute. Every stage of a "typical" instruction handling (like decode/execute/load-store) is done in one clock.

To provide an interface with entities outside of the processor, a memory interface 102 may be present. In one embodiment, memory interface 102 may provide an interface to a relatively fast memory such as a cache memory, e.g., a static random access memory (SRAM), which may be adapted on the same semiconductor die as the PbP, although interfacing to other memories or other storages is also possible. Furthermore, while shown with the details of a programmable bit processor only in the embodiment of FIG. 1, understand that this processor may be part of a media stream processor such as may be present in a semiconductor device, such as a processor, chipset or other such device.

As seen further in FIG. 1, decode unit 105 may receive a current instruction from an instruction cache or buffer 130. Instruction buffer 130 may hold the microcode instructions for the PbP on how to operate. In various embodiments, instruction cache 130 may be a direct-mapped cache having a plurality of cache lines each of which may store an instruction, corresponding address and valid indicator. Based on information received from an instruction selection logic 132 which in one embodiment may include a content addressable memory and prefetch logic, a selected address may be selected in an output multiplexer 138 and provided through a flop 139 to decode unit 105. As seen, logic 132 may receive an instruction pointer 133, generated from an instruction fetch unit 131, which may receive information both from decode unit 105 and execution unit 110. To obtain further instructions for storage in instruction cache 130, an instruction read controller 134 may communicate via memory interface 102.

As further seen in FIG. 1, decode unit 105 may provide a decoded instruction to execution unit 110 and further may provide an immediate value to an input multiplexer 152, which may provide a selected one of the inputs to a register file 150. In various embodiments, register file 150 may include a plurality of registers. For example, multiple general-purpose and special-purpose registers may be present, each of which may include a data field and a corresponding valid indicator. Additional information may be stored in a back up portion of register file 150 that may be present in another storage location, e.g., as part of the SRAM discussed above. As further seen, register file 150 may interface directly with a media stream processor (MSP) interface 151.

Responsive to the decoded instruction received from decode unit 105, execution logic 110 may execute a given instruction using one or more data values received from register file 150 or directly provided as stream data received from a stream buffer 120. A computed value may be provided back to register file 150 and/or output as valid stream data through an output buffer, described below as report buffer 142.

With regard to stream buffer 120, it may be used to hold the stream data on which the PbP operates. Stream buffer 120 may be implemented as a ping-pong stream buffer including a first stream buffer 125a and a second stream buffer 125b, each of which may store stream data, a corresponding address and a valid indicator. In the embodiment shown in FIG. 1, each stream buffer may store 16 bytes (B) of stream data, although the scope of the present invention is not limited in this regard. The stream data to be stored in the stream buffer may be received via memory interface 102 and data may be requested for input to a given one of the stream buffers under control of a stream fetcher 122.

The corresponding selected stream data output from a given stream buffer may be provided through a stream data steering logic 124, which in one embodiment may further include a content addressable memory. As seen, this steering logic may be controlled by a stream pointer 143 which in one embodiment may be generated by a stream pointer controller, based on information from decode unit 105 and execution unit 110.

Referring still to FIG. 1, additional buffers may be present, namely a report buffer 142 and an input buffer 140. Input buffer 140 may hold additional input parameters for the PbP to function. Typically, this may include a programmable range descriptor (PRD) list, but it is not limited to this usage. Report buffer 142 may hold the status report of the PbP, governed by the microcode. Although not limited in this regard, in one embodiment each buffer may provide for storage of 16 bits of information and may act as an interface for loading and storing data and address information. As seen, each of these buffers may be controlled by corresponding pointers, namely a report pointer 146 and an input pointer 148, which in turn may be generated in an output pointer controller 145 and an input pointer controller 147. While shown with these particular structures and arrangement in the embodiment of FIG. 1, understand that a programmable bit processor in accordance with an embodiment of the present invention can take other forms in different embodiments.

Figure 2:
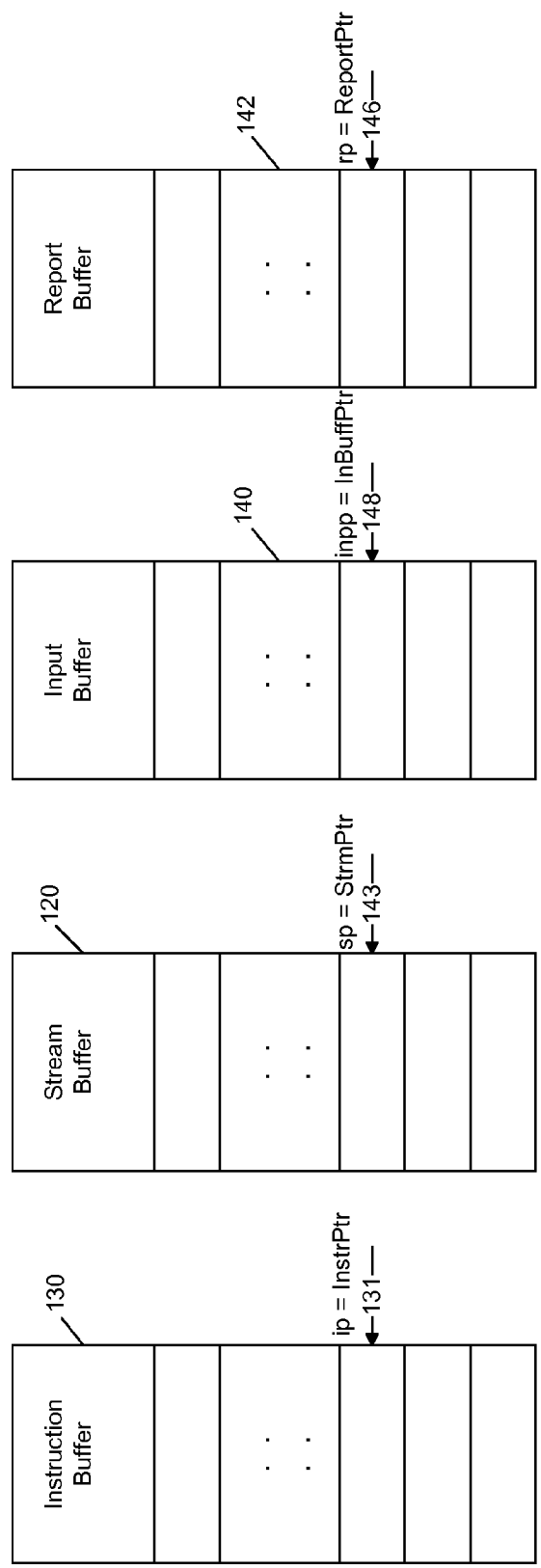
FIG. 2 is a block diagram of various data buffers in accordance with an embodiment of the present invention.

As described above, there may be four data structures operated on by the programmable bit parser hardware. Referring to FIG. 2, shown is a block diagram of various data buffers in accordance with an embodiment of the present invention, along with corresponding pointers to such buffers. Specifically, as seen in FIG. 2, instruction buffer 130, stream buffer 120, input buffer 140, and report buffer 142 are shown, each of which with their corresponding pointers.

The instruction buffer's pointer 131, ip, is maintained by the PbP. It points to the current instruction being executed. In one embodiment, instruction pointer 131 points to a double word (DW) (4 B) granular address. The stream data buffer's pointer 143, sp, is maintained by the PbP. It points to the current bit of the stream data being operated on. Also note that the bit position indicated by sp is relative to the start of the stream data buffer. As discussed further below, in hardware assisted bit parsing performed by embodiments of the present invention, this single bit pointer may be controlled by the execution logic of the PBP such that it can transparently move the pointer to a given bit of the media stream, effectively ignoring the non-stream data, such as headers, other interleave packets and so forth. In one embodiment, the input buffer's pointer 148, inpp, is maintained by the PbP, and may be used to point to the bit location in this buffer where the next (up to) 16 b will be loaded from. Also note that the position indicated by inpp is relative to the start of the input data buffer. Finally, the report buffer's pointer 146, rp, is maintained by the PbP and may point to the bit location in this buffer where the next report will be loaded. Also note that the bit position indicated by rp is relative to the start of the report data buffer.

In various embodiments, an instruction set architecture (ISA) for the PbP can be defined around a 32 b encoding scheme with the ability to support 64 b encoding if necessary. Instructions are treated as 32 b format unless they contain a specific opcode encoding used to indicate the current 32 b is the low portion of a 64 b instruction.

In different embodiments, there can be a limited amount of instructions available in the ISA. For example, in one embodiment there can be a combination of 32 b instructions and 64 b instructions that make up the PbP ISA. In general, these include instructions directed to operations to be performed in the various buffers, including stream buffer, output buffer and report buffer. In addition, other instructions may relate to fix up actions that can be used to control PbP hardware used to track points of interest within the stream and communicated across various stages of the MSP. Other operations encoded in instructions of the ISA may include instructions to be executed in one or more arithmetic logic units (ALUs) of the execution unit. Still further instructions of the ISA may be directed to program flow operations such as jumps, switches, returns halts and so forth.

Referring now to Tables 1-5, shown are listings of sample instructions according to an ISA in accordance with an embodiment of the present invention.

TABLE 1

| ALU Instructions | | |
| --- | --- | --- |
| Instruction | Operation | Description |
| Add<Reg;Imm> | a ← a + b | Add |
| Sub<Reg;Imm> | a ← a − b | Subtract |
| AND<Reg;Imm> | a ← a AND b | logical bit wise AND |

TABLE 1-continued

| ALU Instructions | | |
|---|---|---|
| OR<Reg;Imm> | a ← a OR b | logical bit wise OR |
| XOR<Reg;Imm> | a ← a XOR b | logical bit wise exclusive-OR |
| ShiftLeft<Reg;Imm> | a ← a << [b] | logical shift left<br>only the lower 4 bits of 'b' are used as the shift value (0x0 to 0xF)<br>any value greater than 0xF will be aliased into a value between 0x0 and 0xF since only the lower 4 bits of 'b' are used |
| ShiftRight<Reg;Imm> | a ← a >> [b] | logical shift right<br>only the lower 4 bits of 'b' are used as the shift value (0x0 to 0xF)<br>any value greater than 0xF will be aliased into a value between 0x0 and 0xF since only the lower 4 bits of 'b' are used |
| Add<Reg;Imm>.f | a + b | Non Destructive Add |
| Sub<Reg;Imm>.f | a − b | Non Destructive Subtract |
| AND<Reg;Imm>.f | a AND b | Non Destructive AND |
| OR<Reg;Imm>.f | a OR b | Non Destructive OR |
| XOR<Reg;Imm>.f | a XOR b | Non Destructive XOR |
| ShiftLeft<Reg;Imm>.f | a << [b] | Non Destructive LSL<br>only the lower 4 bits of 'b' are used as the shift value (0x0 to 0xF)<br>any value greater than 0xF will be aliased into a value between 0x0 and 0xF since only the lower 4 bits of 'b' are used |
| ShiftRight<Reg;Imm>.f | a >> [b] | Non Destructive LSR<br>only the lower 4 bits of 'b' are used as the shift value (0x0 to 0xF)<br>any value greater than 0xF will be aliased into a value between 0x0 and 0xF since only the lower 4 bits of 'b' are used |

| ALU Instruction Symbol Description | |
|---|---|
| Instruction/Operation Symbol | Description |
| a | Source Operand 1 Rn; Destination Register Rn |
| b | Source Operand 2 |
| .f | Flag Update Only |
| <Reg> | Source Operand 2 is a register Rm. |
| <Imm> | Source Operand 2 is an Immediate Value |

TABLE 2

| Program Flow Instructions | | |
|---|---|---|
| Instruction | Operation | Description |
| Jump<Reg;Imm> | next ip=a if condition V/Msk is true<br>next IPIndex=CurrIPIndex | Conditional Jump |
| Halt | next ip=curr ip<br>next IPIndex=CurrIPIndex | Halt execution |
| SwitchRestart<Reg;Imm> | next ip=StartIPArray[a]<br>next IPIndex=a | Switch to the beginning of Task specified<br>Note: 'a' is in the range of 0 to 15 since only 16 entries exist in the Suspend IP Array. A value greater than 15 will be aliased into a value between 0 and 15 since only the lower 4 bits of 'a' are used. |
| Switch<Reg;Imm> | next ip=SuspendIPArray[a]<br>next IPIndex=a | Resume Task specified<br>Note: 'a' is in the range of 0 to 15 since only 16 entries exist in the Suspend Task Array. A value greater than 15 will be aliased into a value between 0 and 15 since only the lower 4 bits of 'a' are used. |

TABLE 2-continued

Program Flow Instructions

| | | |
|---|---|---|
| Call<Reg;Imm> | next ip=a if condition V/Msk is true<br>next IPIndex=CurrIPIndex | Conditional Call |
| Ret | next ip = ReturnIPArray[CurrIPIndex]<br>next IPIndex=CurrIPIndex | Return from Call'ed routine |
| Iret | next ip=IRETIP<br>next IPIndex=IRETIPIndex | Return from virtualization engine (VE) firmware (Fw) Interrupt and Halt |
| IntrCont | next ip=curr ip + 1<br>next IPIndex=CurrIPIndex | Interrupt VE FW and continue execution<br>$z[0]=0 \rightarrow$ use HdrParse Int Source<br>$z[0]=1 \rightarrow$ use MB Detect Int Source<br>interrupt uCODE status ← Imm Value<br>Note: 'z' is a value in the range of 0x0 to 0x1. A value greater than 0x1 will be aliased into a value between 0x0 and 0x1 since only the lower bit of 'z' is used. |
| IntrHalt | next ip=curr ip<br>next IPIndex=CurrIPIndex | Interrupt VE FW and Halt<br>$z[0]=0 \rightarrow$ use HdrParse Int Source<br>$z[0]=1 \rightarrow$ use MB Detect Int Source<br>interrupt uCODE status ← Imm Value<br>Note: 'z' must be a value in the range of 0x0 to 0x1. A value greater than 0x1 will be aliased into a value between 0x0 and 0x1 since only the lower bit of 'z' is used. |

Program Flow Instruction Symbol Description

| Instruction/Operation Symbol | Description |
|---|---|
| a | Source Operand |
| <Reg> | Source Operand is a register Rm. |
| <Imm> | Source Operand is an Immediate Value |
| V/Msk | Condition to be evaluated |

TABLE 3

Register File Instructions

| Instruction | Operation | Description |
|---|---|---|
| StoreIP | a ← ip | Store Instruction Ptr |
| MoveReg | a ← b | Register Move Operation |
| LdRegImm | a ← b | Register Load Operation<br>Note that this instruction will only load a Fast register (Special Purpose Reg or Register <128) |
| LdCurrPRDAddr | a ← {xyzPRDBase++Offset}; | Load Current PRD Address for a given MSP pipestage<br>if(z[2:0]=0:1:2:3:4:5) then {<br>xyz = OutDMATF: OutDMAT123: MBDetect: ByteParser: HdrParser: InDMA<br>}<br>if(z[3]=0), then {offset=RdPtr} else {offset=WrPtr}<br>Note that for debug purposes, a z[3:0] value of 6h will load in the fixup table base address. |

TABLE 3-continued

Register File Instructions

Note that a z[3:0] value of 7h, 14h and 15h will load a value of 0 since these are not defined. Any value greater than 15h will be alised to a value between 0h and 15h.

Register File Instruction Symbol Description

| Instruction/Operation Symbol | Description |
| --- | --- |
| a | Destination Register Rn |
| b | Source Operand |
| z | Misc Value |
| <Reg> | Source Operand is a register Rm<br>m AND n cannot be >127, either m or n can be >127. |
| <Imm> | Source Operand is an Immediate Value |

TABLE 4

Stream/Output/Input Buffer Instructions

| Instruction | Operation | Description |
| --- | --- | --- |
| Stream Buffer | | |
| LdSP | sp ← a | Load Stream Ptr |
| StoreSP | a ← sp | Store Stream Ptr |
| SFBitsReg | sp ← sp + a | Update the Stream Ptr by Shifting Forward by "a" Bits<br>note: if a = 0, shift by 256 bits.<br>note: any 'a' value greater than 0xFF will be aliased into a value between 0x00 and 0xFF since only the lower 8 bits of 'a' are used. |
| SBBitsReg | sp ← sp − a | Update the Stream Ptr by Shifting Back by "a" Bits<br>note: if a = 0, shift by 256 bits.<br>note: any 'a' value greater than 0xFF will be aliased into a value between 0x00 and 0xFF since only the lower 8 bits of 'a' are used. |
| SFBytesReg | sp ← sp + (a*8) | Update the Stream Ptr by Shifting Forward by "a" Bytes<br>note: a maximum of 256 B is supported with the following limitation. Although a maximum of 256 B is supported, it is not recommended for uCODE to cross 2 meaningful boundries with a single instruction. Ex. SFBytesReg of >192 B is not recommended if subpack boundry crossing is enabled since this may result in crossing 2 subpack boundries with a single instruction.<br>note: a = 0 → shift by 256 bytes.<br>note: any 'a' value greater than 0xFF will be aliased into a value between 0x00 and 0xFF since only the lower 8 bits of 'a' are used. |
| SBBytesReg | sp ← sp − (a*8) | Update the Stream Ptr by Shifting Back by "a" Bytes<br>note: a maximum of 256 B is supported with the following limitation. Although a maximum of 256 B is supported, it is not recommended for uCODE to cross 2 meaningful boundries with a single instruction. Ex. SFBytesReg of >192 B is not recommended if subpack boundry crossing is enabled since this may result in crossing 2 subpack boundries with a single instruction. |

TABLE 4-continued

Stream/Output/Input Buffer Instructions

| | | |
|---|---|---|
| | | note: a = 0 → shift by 256 bytes. |
| | | note: any 'a' value greater than 0xFF will be aliased into a value between 0x00 and 0xFF since only the lower 8 bits of 'a' are used. |
| SFBits | sp ← sp + p | Update the Stream Ptr by Shifting Forward by "p" Bits |
| | | note: if p = 0, shift by 16 bits. |
| | | note: any 'p' value greater than 0xF will be aliased into a value between 0x0 and 0xF since only the lower 4 bits of 'p' are used. |
| SBBits | sp ← sp − p | Update the Stream Ptr by Shifting Back by "p" Bits |
| | | note: if p = 0, shift by 16 bits. |
| | | note: any 'p' value greater than 0xF will be aliased into a value between 0x0 and 0xF since only the lower 4 bits of 'p' are used. |
| SFBytes | sp ← sp + (p*8) | Update the Stream Ptr by Shifting Forward by "p" Bytes |
| | | note: a maximum of 16 B is supported. |
| | | note: a = 0 → shift by 16 bytes. |
| | | note: any 'p' value greater than 0xF will be aliased into a value between 0x0 and 0xF since only the lower 4 bits of 'p' are used. |
| SBBytes | sp ← sp − (p*8) | Update the Stream Ptr by Shifting Back by "p" Bytes |
| | | note: a maximum of 16 B is supported. |
| | | note: a = 0 → shift by 16 bytes. |
| | | note: any 'p' value greater than 0xF will be aliased into a value between 0x0 and 0xF since only the lower 4 bits of 'p' are used. |
| LdInitSB | InitSB ← a | Load the Init Buffer. |
| LdReg | a ← "00..00" & SB[(sp+(p−1)):sp] | Store a portion of the the Stream Buffer contents. |
| | | The size of the content is determined by "p" and can range from 1 to 16 bits. |
| | | A non 16 bit size will be filled with 0's in the unspecified bits. |
| | | IF p[4]=1 THEN sp ← sp+p |
| | Input Buffer | |
| LdInpP | inpp ← a | Load Input Ptr |
| | | Note: relative pointer is reset when loading a new input pointer. |
| StoreInpP | a ← inpp | Store Input Ptr |
| InDataRegInc | a ← IB[(IBA+((p*8)+7)):IBA] | if z>0 then { |
| | | ip_ptr[15:0] = in_ptr[15:0] + z; |
| | | in_ptr_rel[3:0] = "0000"; //clear relative ptr |
| | | } |
| | | else { |
| | | in_ptr_rel[3:0] = in_ptr_rel[3:0] + p + 1; //inc rel ptr |
| | | } |
| | | Input Buffer Address to start reading from: |
| | | IBA = in_ptr[15:4] ++ (in_ptr[3:0] ++ in_ptr_rel[3:0]; |
| | | note: p is 0's based encoded where: |
| | | p[0] = 0 → 1 Byte |
| | | p[0] = 1 → 2 Bytes |
| | | note: if p = 0, MSB byte is padded with 0's |
| | | note: any 'p' value greater than 0x1 will be aliased into a value between 0x0 and 0x1 since only 'p[0]' is used. |

TABLE 4-continued

Stream/Output/Input Buffer Instructions

Report Buffer

| | | |
|---|---|---|
| LdRP | rp ← a | Load Report/Output Ptr<br>Note: relative pointer is reset when loading a new input pointer. |
| StoreRP | a ← rp | Store Report/Output Ptr |
| OutData[Reg\Imm]Inc | RB[(RBA+((p*8)+7)):RBA]<br>← a[((p*8)+7)):0] | if z>0 then {<br>rp_ptr[15:0] = rp_ptr[15:0] + z;<br>rp_ptr_rel[3:0] = "0000"; //clear relative ptr<br>}<br>else {<br>rp_ptr_rel[3:0] = rp_ptr_rel[3:0] + p + 1; //inc rel ptr<br>}<br>Report Buffer Address to start writing to:<br>RBA = rp_ptr[15:4] ++ (rp_ptr[3:0] ++ rp_ptr_rel[3:0];<br>note: p is 0's based encoded where:<br>p[0] = 0 → 1 Byte<br>p[0] = 1 → 2 Bytes<br>note: if p = 0, MSB byte is not written.<br>note: any 'p' value greater than 0x1 will be aliased into a value between 0x0 and 0x1 since only 'p[0]' is used. |

Stream/Output/Input Buffer Instruction Symbol Description

| Instruction/Operation Symbol | Description |
|---|---|
| a | Source Operand Rn/IV (IV only for OutDataImmInc inst); Destination Register Rn |
| p | Stream Bits |
| z | Misc Value |

TABLE 5

Fix Up Table Instructions

| Instruction | Operation | Description |
|---|---|---|
| DecrFUTCntrs | FUTCnt[k] = max{FUTCnt[k] − 1,0} | Decrement all non zero Fix Up Counters.<br>Counters will not wrap under. |
| LdFUTCntr | FUTCnt[m] = a[15:0] | Allocate a Fix Up Counter (FUTCnt_valid[m] ← 1) and Load a value of "a" to the allocated counter.<br>Allocated counter M will be indexed by any subsequent FUDLWrite instruction(s) until the next LdFUTCntr insrtuction executes allocating a new counter.<br>DecFUTCntrs does not change the status of the allocated counter M. |
| FUDLWrite | FUT.loc{FUTBA+(m*8)+z}[15:0]<br>← a | Update a 2 B portion of the selected Fix Up Table entry.<br>Load the value of "a" into offset z of the Fix Up Table Entry M. M is the current counter held by the previous LdFUTCntr instruction.<br>Note: 'z' is a value in the range of 0x0 to 0x7. A value greater than 0x7 will be aliased into a value between 0x0 and 0x7 since only the lower 3 bits of 'z' are used. |

TABLE 5-continued

Fix Up Table Instructions

Fix Up Table Instruction Symbol Description

| Instruction/Operation Symbol | Description |
| --- | --- |
| a | Source Operand Rn |
| z | Misc Value |

As described above, in various embodiments a register file may have a relatively large number of available registers. This is so, as typical compression formats may include use of many variables to provide parameters for stream parsing. Accordingly, under control of microcode, the PbP may store these temporary values in the register file. While the scope of the present invention is not limited in this regard, each register can be 16 b wide, in one embodiment. To provide access more efficiently to a large number of values, microcode can access more registers than available in the register file. For example, in an embodiment in which the register file itself includes 128 entries, a total of 512 registers can be made accessible by the microcode. More specifically, these 512 registers can be categorized as 3 types of registers, namely special-purpose hardware registers which in one embodiment can include 32 such registers (and which may also be used as general purpose registers), general purpose hardware registers of which there may be 128, in one embodiment, and finally general-purpose backup registers, which may be stored in SRAM.

Figure 3:
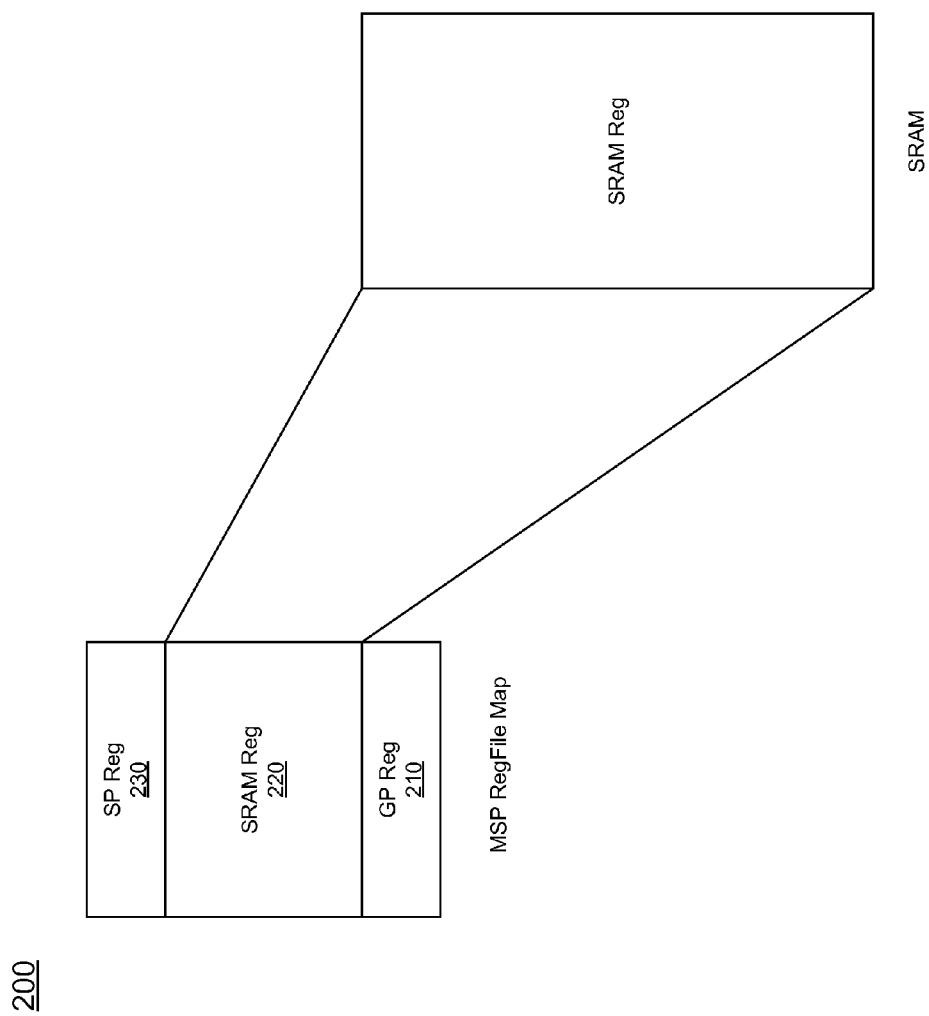
FIG. 3 is a mapping of register files to a memory backup in accordance with an embodiment of the present invention.

Referring now to FIG. 3, shown is a mapping of register files to a memory backup in accordance with an embodiment of the present invention. As shown in FIG. 3, a register file mapping 200 may include general-purpose registers 210, special-purpose registers 230, both of which are present in the physical registers of the PbP, and a SRAM register mapping 220, which may correspond to a portion of a SRAM memory space, e.g., coupled to the PbP by a memory interface. In the illustration of FIG. 3, there are ((512-128)-(512-SP Base)) SRAM registers that can be logically accessible as registers in the program. The PbP hardware can manage accesses (to/from SRAM) in a program-agnostic manner. In one embodiment, movement from or to SRAM registers can occur responsive to a MoveReg Instruction.

As discussed above, stream buffer 120 may be implemented in a ping-pong manner. More specifically, the stream buffer infrastructure allows a program to superimpose a working window on the bitstream to be processed. This eliminates the need for a programmer to maintain an accumulator which constantly needs to be filled with bits when new symbols are consumed. In one embodiment, at any given time the stream buffer can be mapped to an 8 KB SRAM window available for the PbP to consume stream data, and the stream buffer can handle data in little endian format. The stream buffer may be assigned a special purpose register to store a value used to determine a base address in the SRAM to which the buffer is mapped. Instructions that access the stream buffer will result in a 1 to 16 bit access.

Figure 4:
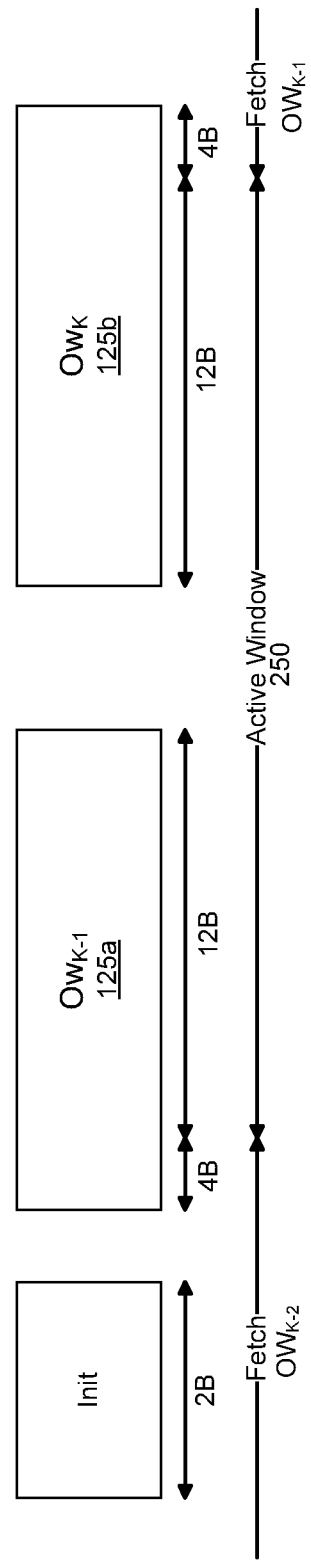
FIG. 4 is a block diagram of a stream buffer operation in accordance with one embodiment of the present invention.

Referring now to FIG. 4, shown is a block diagram of a stream buffer operation in accordance with one embodiment of the present invention. As shown in FIG. 4, an active window 250 is formed that corresponds to 32 B of data obtained from the dual stream buffers 125a and 125b. That is, at any given time, there is a 32 B window of stream data that is being operated upon by the PbP. During operation, the PbP fetches the next 16 B, OWK+1, of stream data when the current stream pointer's, sp, byte location increments to (or exceeds) an upper threshold byte position of the window encompassed by the ping-pong buffer, OWK−1 & OWK. Similarly, the PbP fetches the previous 16 B, OWK−2, when the current stream pointer's, sp, byte location decrements to (or lesser than) a lower threshold byte position of the window encompassed by the ping-pong buffer, OWK−1 & OWK.

In this way, the hardware of the PbP provides support for boundary detection. As a result, parsing programs can be written agnostic to location of transport and other header bits embedded in the bitstream. Instead, processor hardware can detect these header boundaries when consuming a symbol and provide an interrupt. In general, this interrupt may cause the currently processing stream data to be stored in a temporary buffer (in for example the execution unit of the PbP), handle the non-symbol data, and then exit from the interrupt handler that handles this non-symbol data. Then, after resuming from the interrupt handler, the bit parsing program can continue to consume the symbol straddling the header bits without explicit code in the bit parsing program for the operating.

Thus in various embodiments, microcode can determine a "fault" boundary when it encounters transport headers. However, such boundary fault detection can be enabled/disabled. When enabled, the PbP hardware keeps track of the stream pointer, allowing a boundary fault to be detected. The PbP hardware stores an unexecuted ip address of a bit parsing program in this event, and further stores the unconsumed bits before the boundary fault.

In various embodiments, the input buffer (which is separate from the stream buffer) can be used, for example, to read a current pipe stage's PRD data structures. This information may be used to generate instructions/data for a next stage in the pipeline. For example in the case of integrated Advanced Access Content System (iAACS), this information can be used to generate an instruction sequence that a smart direct memory access (DMA) engine uses to output data back to the media application on a host processor.

Figure 5:
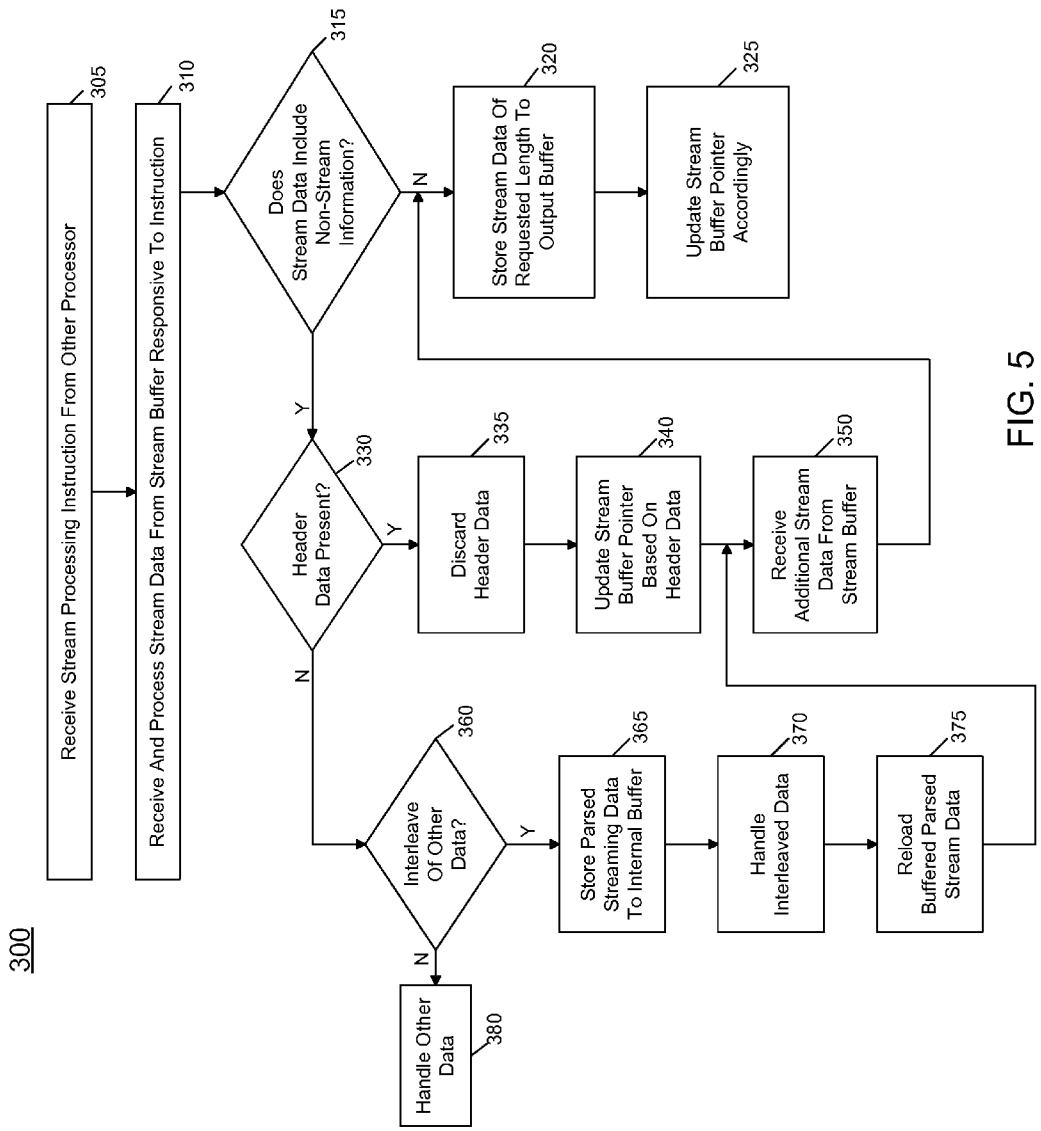
FIG. 5 is a flow diagram of a method in accordance with one embodiment of the present invention.

Referring now to FIG. 5, shown is a flow diagram of a method in accordance with one embodiment of the present invention. As shown in FIG. 5, method 300 may be used to handle a stream parsing operation responsive to a single instruction. This single instruction may be received from another portion of a media stream processor and may correspond to an instruction to parse a given amount of data from a stream buffer. For example, in one embodiment the instruction may request parsing of 16 bytes of data. As discussed above, because the incoming data provided through the stream buffers may include non-stream data in addition to stream data, the bit processor may flexibly handle this non-stream data to accommodate the requested instruction. That is, the PbP can perform various operations responsive to microcode of the PbP hidden from the requester (such as stream parsing code), to obtain the required requested data regardless of the presence of other information within the stream.

As seen in FIG. 5, method 300 may begin by receiving a stream processing instruction from another processor, e.g., another portion of a media stream processor (block 305). Responsive this instruction, the PbP can receive and process stream data (block 310). More specifically, the execution logic of the bit processor can access the stream buffer and process a chunk of data, e.g., 16 B, although the scope of the present invention is not limited to such sized chunks. Next, control passes to diamond 315 where it can be determined whether the stream data includes non-stream information. That is, the execution logic may analyze the received stream data to determine whether in addition to stream data other information is included such as packet headers and so forth. Such determinations may be made based on, e.g., special non-stream header symbols.

If it is determined that the received data is all stream data, control passes to block 320, where the stream data may be stored to an output buffer. More specifically, the requested length of stream data that has been bit parsed can be stored to an output buffer. For purposes of discussion, assume that this stream data may correspond to 16 B. In addition, a stream buffer pointer may be updated accordingly (block 325). That is, the stream pointer for the stream buffer may be updated to point to the next 16 B chunk (and the stream buffer fetch unit can fetch this next chunk), as the stream data that was accessed has been fully processed.

Still referring to FIG. 5, if instead at diamond 315 it is determined that the stream data includes non-stream information, control passes to diamond 330. There it may be determined whether header data is present. If so, control passes to block 335. There, the header data may be discarded. That is, because the instruction that is being handled is for parsing of stream data, this header information has no bearing and accordingly, the execution logic may simply discard the data. Control then passes to block 340 where the stream buffer pointer may be updated based on the header data. For example, assume that the header information is determined to be 2 B. Accordingly, because additional stream data may need to be access to fully parse the requested data amount, the stream buffer pointer may be updated, e.g., by 2 B so that this additional stream chunk can be accessed by the execution logic. Then control passes to block 350, where additional stream data may be received from the stream buffer. Note that this operation to obtain additional stream data for parsing is not pursuant to an additional instruction but instead is pursuant to the prescription of the specified data amount of the original instruction and is handled natively in microcode of the PbP, invisibly to the requester (e.g., bit parsing code or other engine of a media stream processor).

As seen at block 350, this additional stream data may correspond to the width of the header data. In the example above, this means that an additional 2 B of data may be obtained. Accordingly, control passes to block 320 discussed above. Note however that in other implementations, because it may be uncertain whether the additionally accessed stream data is in fact stream data, control can instead pass back to diamond 315, discussed above.

If instead the non-stream data is not determined to be header data, control passes to diamond 360, where it may be determined whether this non-stream data is an interleave of other data. For example, the non-stream data may be interleaved data, e.g., including different information to be processed or so forth. If so, control passes to block 365 where the parsed streaming data may be stored to an internal buffer. That is, for the previously parsed data that is valid stream data, it may be stored in an internal buffer of the execution logic so it can be further processed after handling of the interleaved data. Note that the manner of performing interleave handling and thereafter returning back to regular stream parsing can be responsive to an interrupt that initiates execution of an interrupt handler, which at the conclusion of its processing returns control back to the main stream parsing program.

Accordingly at this time control passes to block 370, where the interleaved data may be handled. Such handling may be performed responsive to a given interrupt handler which itself may vary depending on the type of interleaved data. Also the processing performed may also vary depending on the type of interleaved data. But in some embodiments where the interleaved data is of a different video content, audio information or so forth, the interleaved data may be bit parsed by the execution logic and various operations to perform the parsing and provide the parsed data along to other portions of a media processor can be performed.

Then, control passes back to block 375, which may occur at the conclusion of the interrupt handler, which presumably has completed processing on the interleaved data. At block 375, which may occur responsive to the bit processor microcode, the buffered parsed stream data may be reloaded and any additional stream data that is needed to generate a unit of parsed stream data of the requested amount can be accessed at block 350 as discussed above.

Finally with regard to FIG. 5, if the non-stream data is of another type, control may pass to block 380 where this other type of non-stream data may be handled. For example, a boundary may be detected and an interrupt handler invoked. While shown with this particular implementation in the embodiment of FIG. 5, understand the scope of the present invention is not limited in this regard.

Thus in various embodiments, a native programmable bit processor may be provided with dedicated bit stream parsing capabilities. Using a processor in accordance with an embodiment of the present invention, a bit parsing routine can avoid the need to use a conventional byte/word datapath to load stream data into local registers, byte/word at a time, and process the data internally with register move, shift, logical AND/OR, or other data handling/processing instructions. This conventional implementation would require many instructions to be executed in an attempt to extract a variable bit length field from a stream. Rather, a processor in accordance with an embodiment the present invention may provide for execution of simple bit parsing routines that shield the programmer of the parsing program from any operations with regard to determining the presence and handling of non-stream data such as headers, control information, interleaved data and so forth.

As seen above in FIG. 1, a programmable bit processor in accordance with an embodiment of the present invention may include a separate dedicated input stream datapath and instruction set dedicated for media stream bit processing, along with separate conventional load/store and instruction stream data paths. This reduces the need for instruction intense bit processing routines as can be offloaded onto, e.g., microcode of the programmable bit processor. Accordingly, in various embodiments bit level processing can be performed without the need for writing and executing complex programs that do intelligent load/store, splicing, detection of header boundaries, etc.

Figure 6:
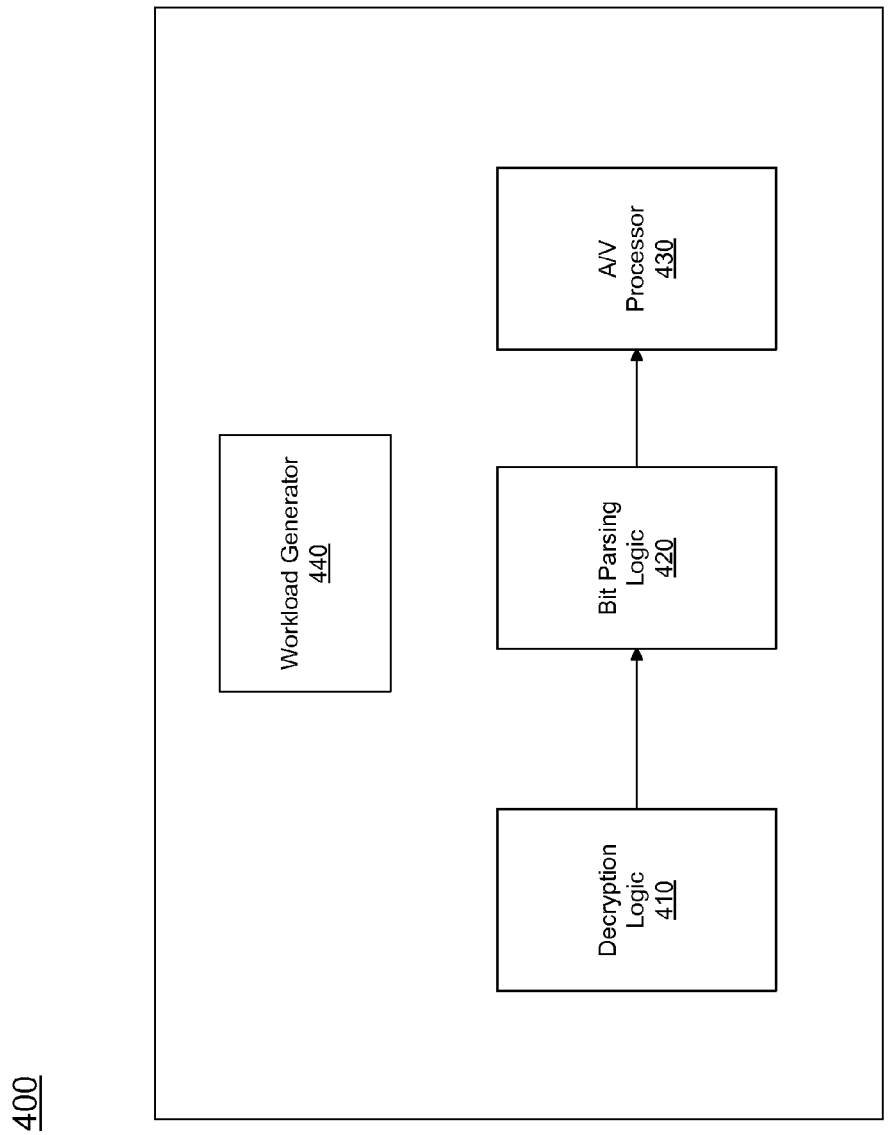
FIG. 6 is a block diagram of a media stream processor accordance with an embodiment of the present invention.

As described above, the bit processor can be part of a larger media stream processor including various engines. Referring now to FIG. 6, shown is a block diagram of a media stream processor in accordance with an embodiment of the present invention. As shown in FIG. 6, a media stream processor 400 may include various components. Although the scope of the present invention is not limited in this regard, in some implementations a media stream processor may be incorporated at least in part within a chipset component of a computer system.

As seen in FIG. 6, media stream processor 400 may include a decryption logic 410, which may be used to decrypt incoming data that is encrypted according to a given encryption protocol, such as, for example, the BLU-RAY™ format for high-definition digital versatile discs (DVDs). After decryption, the decrypted data may be provided to a buffer such as a SRAM associated with the media stream processor. Then, bit parsing logic 420, which may be a programmable bit processor in accordance with an embodiment of the present invention can be used perform bit parsing operations on the data and provide parsed data back to the buffer. Finally, desired processing, which may be in the form of audio/video processing depending on the particular content, may be performed in an audiovisual processor 430. Note that this processor may be of the same component, or may be a separate graphics card, in some embodiments.

As seen, various operations performed in a media processing may be responsive to a workload generator 440. In various environments, workload generator 440 may generate PRD's that can be used to provide workloads to the different engines. In addition, the engines themselves may create, modify and consume workloads via these PRD's. In addition, workload generator 440 may provide information such as pointers in connection with the PRD's to enable a given engine to access the data to be worked upon, which may be present in a given buffer, as discussed above. While shown with this particular implementation in the embodiment of FIG. 6, understand the scope of the present invention is not limited in this regard.

Figure 7:
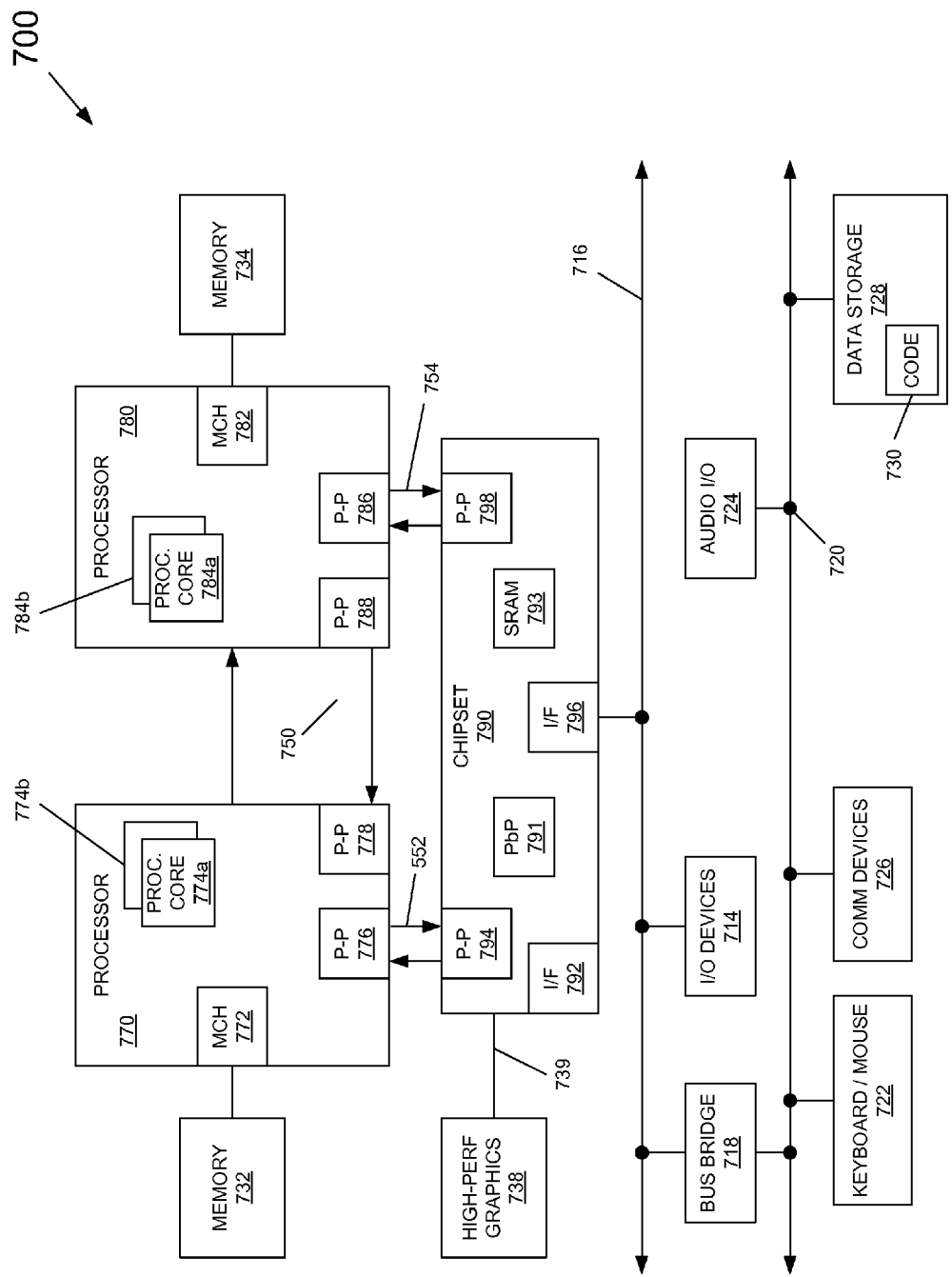
FIG. 7 is a block diagram of a system in accordance with one embodiment of the present invention

Embodiments may be implemented in many different system types. Referring now to FIG. 7, shown is a block diagram of a system in accordance with an embodiment of the present invention. As shown in FIG. 7, multiprocessor system 700 is a point-to-point interconnect system, and includes a first processor 770 and a second processor 780 coupled via a point-to-point interconnect 750. As shown in FIG. 7, each of processors 770 and 780 may be multicore processors, including first and second processor cores (i.e., processor cores 774a and 774b and processor cores 784a and 784b), although potentially many more cores may be present in the processors.

Still referring to FIG. 7, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 7, MCH's 772 and 782 couple the processors to respective memories, namely a memory 732 and a memory 734, which may be portions of main memory (e.g., a dynamic random access memory (DRAM)) locally attached to the respective processors. First processor 770 and second processor 780 may be coupled to a chipset 790 via P-P interconnects 752 and 754, respectively. As shown in FIG. 7, chipset 790 includes P-P interfaces 794 and 798.

In addition, chipset 790 may further include a bit processor 791 in accordance with an embodiment of the present invention, and further may include a SRAM 793. While shown only with a bit processor, in some implementations the chipset may include a full media stream processor such as described above with regard to FIG. 6.

Furthermore, chipset 790 includes an interface 792 to couple chipset 790 with a high performance graphics engine 738, by a P-P interconnect 739. In turn, chipset 790 may be coupled to a first bus 716 via an interface 796. As shown in FIG. 7, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
receiving stream data of a first width in an execution unit of a processor from a stream buffer coupled to the execution unit;
processing the stream data responsive to an instruction to process data of the first width, wherein the instruction prescribes the first width;
determining whether the stream data includes header data, and if so receiving additional stream data from the stream buffer and processing the additional stream data responsive to the instruction; and
if the stream data includes non-stream information other than the header data, executing a handler on the execution unit to handle the non-stream information, the handler triggered by microcode of the processor.

2. The method of claim 1, further comprising if it is determined that the non-stream information is the header data, discarding the header data.

3. The method of claim 1, further comprising thereafter updating a stream buffer pointer based on an amount of the non-stream information.

4. The method of claim 3, further comprising storing parsed stream data of the stream data in an internal buffer before handling the non-stream information other than the header data.

5. The method of claim 4, further comprising reloading the stored parsed stream data and accessing additional data corresponding to the amount of the non-stream information from the stream buffer responsive to the updated stream buffer pointer.

6. A processor comprising:
a stream buffer to store data;
an instruction buffer to store microcode; and
an execution unit to receive stream data of a first width from the stream buffer, wherein the execution unit is to process the stream data responsive to an instruction prescribing the first width to process data of the first width, determine whether the stream data includes header data, and if so receive additional stream data from the stream buffer and process the additional stream data responsive to the instruction, and if the stream data includes non-stream information other than the header data, execute a handler to handle the non-stream information, the handler triggered by the microcode.

7. The processor of claim 6, wherein, if the execution unit determines that the non-stream information is the header data, the execution unit is to discard the header data.

8. The processor of claim 6, wherein the execution unit is to thereafter update a stream buffer pointer based on an amount of the non-stream information.

9. The processor of claim 8, wherein the execution unit is to store parsed stream data of the stream data in an internal buffer before handling the non-stream information other than the header data.

10. The processor of claim 9, wherein the execution unit is to reload the stored parsed stream data and access additional data corresponding to the amount of the non-stream information from the stream buffer responsive to the updated stream buffer pointer.

* * * * *